(12) United States Patent
Umehara et al.

(10) Patent No.: US 10,573,909 B2
(45) Date of Patent: Feb. 25, 2020

(54) FUEL CELL SYSTEM

(71) Applicant: TOYOTA JIDOSHA KABUSHIKI KAISHA, Toyota-shi, Aichi-ken (JP)

(72) Inventors: Takahiro Umehara, Toyota (JP); Shinji Aso, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/724,645

(22) Filed: Oct. 4, 2017

(65) Prior Publication Data
US 2018/0114999 A1 Apr. 26, 2018

(30) Foreign Application Priority Data
Oct. 26, 2016 (JP) .................. 2016-209989

(51) Int. Cl.
*H01M 8/04537* (2016.01)
*H01M 8/04955* (2016.01)
*G05F 1/573* (2006.01)

(52) U.S. Cl.
CPC ........ *H01M 8/04559* (2013.01); *G05F 1/573* (2013.01); *H01M 8/04597* (2013.01); *H01M 8/04955* (2013.01)

(58) Field of Classification Search
CPC . H01M 8/04; H01M 8/04537; H01M 8/04559
See application file for complete search history.

(56) References Cited

U.S. PATENT DOCUMENTS

2012/0070756 A1* 3/2012 Yoshida ............ H01M 8/04223
429/429
2017/0214070 A1* 7/2017 Wang ................ H01M 8/04865

FOREIGN PATENT DOCUMENTS

| JP | 2782854 | 8/1998 |
| JP | 2000-021427 A | 1/2000 |
| JP | 2009-283172 A | 12/2009 |
| JP | 2010-218953 | 9/2010 |

* cited by examiner

*Primary Examiner* — Karie O'Neill Apicella
(74) *Attorney, Agent, or Firm* — Finnegan, Henderson, Farabow, Garrett & Dunner, LLP

(57) ABSTRACT

A fuel cell system includes: a fuel cell stack; a voltage sensor configured to detect voltage of the fuel cell stack; a fuel cell relay connected to the fuel cell stack; a switch connected between the fuel cell stack and the fuel cell relay; an overcurrent detector configured to detect an overcurrent flowing to the switch; and a power generation stop device configured to stop power generation of the fuel cell stack when the overcurrent detector detects the overcurrent and the detected voltage becomes a specified value or less.

4 Claims, 2 Drawing Sheets

FUEL CELL SYSTEM

INCORPORATION BY REFERENCE

The disclosure of Japanese Patent Application No. 2016-209989 filed on Oct. 26, 2016 including the specification, drawings and abstract is incorporated herein by reference in its entirety.

BACKGROUND

1. Technical Field

The present disclosure relates to a fuel cell system.

2. Description of Related Art

Fuel cell (FC) systems incorporated in a vehicle have been put in a practical use. For example, a fuel cell system disclosed in Japanese Patent Application Publication No. 2010-218953 includes a fuel cell, a relay that connects or disconnects a supply route of electric power generated in the fuel cell to a motor, a diode provided in a portion of the route closer to the motor than to the relay, the diode being configured to prevent current from flowing from the motor to the fuel cell, and a voltage sensor that detects voltage of the fuel cell. The fuel cell system determines whether or not the diode is in failure based on a difference in voltage detected before and after the relay connects the route.

SUMMARY

The fuel cell system disclosed in JP 2010-218953 A can detect failure of the diode. Accordingly, when the diode is in failure, the fuel cell system can execute fail-safe (F/S) processing. The fail-safe processing is safe processing employed when the system is failed. For example, the fail-safe processing in the fuel cell system includes stopping power generation of the fuel cell.

Some of the fuel cell systems are provided with an open failure detection circuit that detects an open failure of the relay by detecting voltage drop of the fuel cell. When the relay has the open failure, the fuel cell systems execute the fail-safe processing. When a switch connected between the fuel cell and the relay is short-circuited, the fuel cell also exhibits voltage drop that is the same behavior exhibited when the relay has the open failure. Accordingly, providing an open failure detection circuit makes it possible to execute fail-safe processing when the switch is short-circuited. The switch is one component member that constitutes a boost converter that boosts the voltage of the fuel cell.

Incidentally, the fuel cell system disclosed in JP 2010-218953 A has a relay installed on the side closer to the fuel cell than to the boost converter. However, in some of the recent fuel cell systems, the installation location of the relay is changed to the side closer to the motor than to the boost converter in the viewpoint of downsizing. Such change in the installation location of the relay eliminates the necessity of the open failure detection circuit as described before.

However, when the installation location of the relay is changed to the location loser to the motor than to the boost converter, the fail-safe processing, such as opening the relay to disconnect a short-circuit current from the fuel cell, cannot be executed when the switch is short-circuited. When the fail-safe processing is not executed upon short-circuit of the switch, the short-circuit current continues to flow from the fuel cell, which causes overheating of component parts present on the route carrying the short-circuit current, which may result in failure.

The present disclosure provides a fuel cell system capable of executing fail-safe processing when a switch connected between the fuel cell and a relay is short-circuited.

A cell system according to the first aspect of the present disclosure includes: a fuel cell stack; a voltage sensor configured to detect voltage of the fuel cell stack; a fuel cell relay connected to the fuel cell stack; a switch connected between the fuel cell stack and the fuel cell relay; an overcurrent detector configured to detect an overcurrent flowing to the switch; and a power generation stop device configured to stop power generation of the fuel cell stack when the overcurrent detector detects the overcurrent and the detected voltage becomes a specified value or less.

A cell system according to the second aspect of the present disclosure includes: a fuel cell stack; a voltage sensor configured to detect voltage of the fuel cell stack; a fuel cell relay connected to the fuel cell stack; a switch connected between the fuel cell stack and the fuel cell relay; an overcurrent detector configured to detect an overcurrent flowing to the switch; and an electronic control unit programmed to stop power generation of the fuel cell stack when the overcurrent detector detects the overcurrent and the detected voltage becomes a specified value or less.

The above-stated aspect of the present disclosure can provide an effect that a fuel cell system, capable of executing fail-safe processing when the switch connected between the fuel cell and the relay is short-circuited, can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
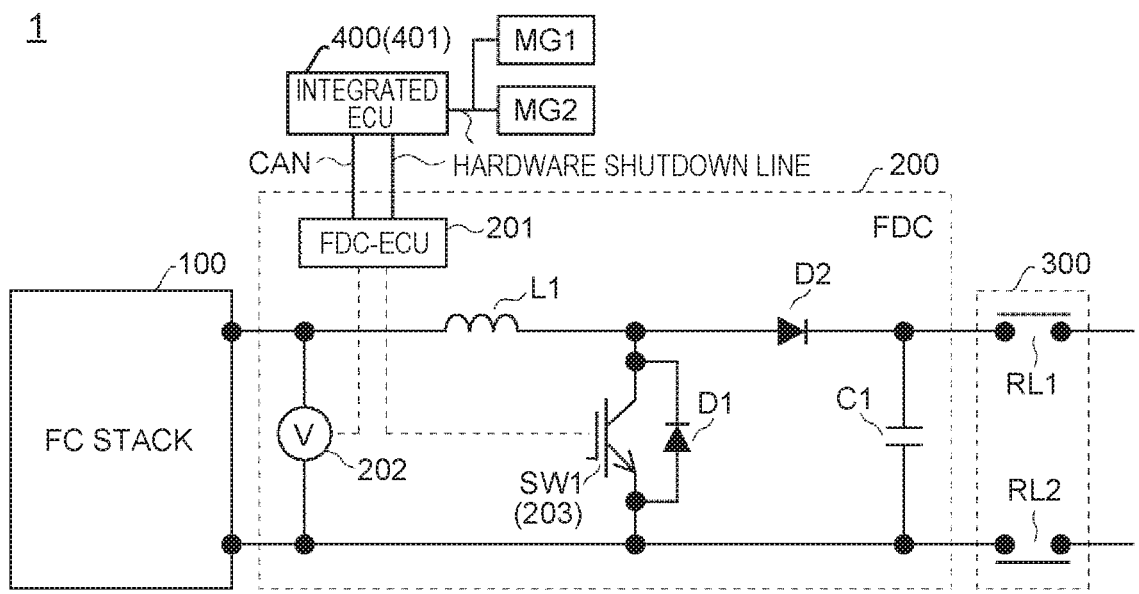
FIG. 1 illustrates a configuration example of a fuel cell system according to an embodiment of the present embodiment.

Hereinafter, an embodiment of the present disclosure will be described with reference to the drawings. First, the configuration of the present embodiment is described. FIG. 1 illustrates a configuration example of a fuel cell system 1 according to the embodiment of the present embodiment. The fuel cell system 1 according to the present embodiment is incorporated in a vehicle, the fuel cell system 1 being used to supply electric power generated in an FC stack 100 to a motor (not illustrated). Examples of the motor include a motor that drives driving wheels of the vehicle and a motor that drives an air compressor.

The fuel cell system 1 according to the present embodiment includes an FC stack 100, an FC boost converter (FDC) 200, an FC relay 300, integrated electronic control unit (ECU) 400, and motor generators MG1, MG2. The FC relay 300 is one example of the fuel cell relay connected to the FC stack 100.

The FC stack 100 is a fuel cell stack structured to include a plurality of unit cells stacked in series. The FC stack 100 generates required electric power by causing a reaction between hydrogen supplied to an anode side and air supplied to a cathode side through an electrolyte membrane.

The FC boost converter 200 is a unidirectional boosting-type converter that boosts the voltage of the FC stack 100 (also properly referred to as FC voltage of the FC stack 100). The FC boost converter 200 includes an FDC-ECU 201, a voltage sensor 202, a coil L1, a switching element SW1, diodes D1, D2, and a condenser C1. The switching element SW1 is one example of the switch connected between the FC stack 100 and the FC relay 300.

The coil L1 has one end connected to a positive electrode-side terminal of the FC stack 100. The switching element. SW1 has one end connected to the other end of the coil L1, and has the other end connected to a negative electrode-side terminal of the FC stack 100. The FDC-ECU 201 boosts the voltage of the FC stack 100 by operating on-off of the switching element SW1 so as to store energy in the coil L1 and to release the stored energy. The boosted electric power (voltage) is supplied to the motor (not illustrated) through the diode D2 and the FC relay 300. The switching element SW1 is connected in parallel to the diode D1 for suppressing surge voltage.

The diode D2 is configured to prevent current from flowing from the motor (not illustrated) to the FC stack 100. The diode D2 has a cathode terminal connected to the other end of the coil L1. The condenser C1 functions as a balancing capacitor having one end connected with an anode terminal of the diode D2 and the other end connected to the other end of the switching element SW1.

The switching element SW1 includes an overcurrent detector 203 that detects overcurrent flowing to the switching element SW1. For example, the switching element SW1 may be configured to include a plurality of metal oxide semiconductor field effect transistors (MOSFETs) and the overcurrent detector 203. In this case, the overcurrent detector 203 may be configured to include a shunt resistor that detects a current flowing through one MOSFET out of the plurality of MOSFETs, and an integrated circuit (IC) that detects whether or not the overcurrent flows to the switching element SW1 based on the current detected by the shunt resistor. The IC can output to the FDC-ECU 201 an overcurrent signal indicative of the detection result of the overcurrent. Whether or not the overcurrent flows to the switching element SW1 may be determined by, for example, comparing a current value detected by the shunt resistor with a threshold value, though the determination method is not limited thereto.

The voltage sensor 202 is connected to both the positive electrode-side terminal and the negative electrode-side terminal of the FC stack 100 to detect the voltage of the FC stack 100.

The FDC-ECU 201 is configured to control the entire FC boost converter 200. For example, the FDC-ECU 201 operates on-off of the switching element SW11 to boost the voltage of the FC stack 100 as described before, while checking whether or not the current detected by the current sensor (not illustrated) disposed between the FC stack 100 and the coil L1 is a desired current value.

The FDC-ECU 201 also determines whether or not fail-safe processing is executed based on the voltage detected by the voltage sensor 202 and on the overcurrent signal output from the overcurrent detector 203. Specifically, the FDC-ECU 201 determines execution of the fail-safe processing, when an overcurrent is detected by the overcurrent detector 203. The FDC-ECU 201 determines that the switching element SW1 is short-circuited, and determines execution of the fail-safe processing, when the overcurrent is detected by the overcurrent detector 203 and the voltage detected by the voltage sensor 202 becomes equal to or less than a specified determination threshold. In the present embodiment, when the overcurrent is detected by the overcurrent detector 203, processing of shutting down the fuel cell system 1 is executed as the fail-safe processing. When the switching element SW1 is short-circuited, processing that prohibits use of the FC stack 100 is executed as the fail-safe processing.

The FC relay 300 includes relays RL1, RL2. The relay RL1 is a relay connecting or disconnecting a positive electrode-side route between the FC stack 100 and the motor (not illustrated). The relay RL2 is a relay connecting or disconnecting a negative electrode-side route between the FC stack 100 and the motor (not illustrated).

The motor generator MG1 functions as a power generator of the motor that drives an air compressor. The motor generator MG2 functions as a power generator of the motor that drives driving wheels of the vehicle.

The integrated ECU 400 controls the entire fuel cell system 1. For example, the integrated ECU 400 functions as a power generation stop device 401 that stops power generation of the FC stack 100, when the fail-safe processing is executed. For example, the integrated ECU 400 stops power generation of the FC stack 100 by such operation as stopping air and hydrogen supply to the FC stack 100. The stop of air and hydrogen supply to the FC stack 100 is implemented by execution of control on the motor generator MG1.

The FDC-ECU 201 and the integrated ECU 400 are connected through a control area network (CAN). Connection between the FDC-ECU 201 and the integrated ECU 400 and between the integrated ECU 400 and the motor generators MG1, MG2 is provided through a hardware shutdown line.

The FDC-ECU 201 and the integrated ECU 400 each have a central processing unit (CPU) and a storage unit. When a program stored in each of the storage units is executed, processing of the FDC-ECU 201 and the integrated ECU 400 in the present embodiment is executed, respectively. That is, the program stored in each of the storage units of the FDC-ECU 201 and the integrated ECU 400 includes codes that makes each of the CPUs execute the processing in each of the FDC-ECU 201 and the integrated ECU 400 in the present embodiment. For example, the storage unit is configured to include given storage devices that can store a variety of information used for the program and the processing in the CPU. For example, the storage devices are memories, hard disks, or the like.

Here, a detailed description is given of the operation to determine whether or not to execute the fail-safe processing because of short-circuit of the switching element SW1 in the FDC-ECU 201.

As described before, the FDC-ECU 201 determines that the switching element SW1 is short-circuited, and determines execution of the fail-safe processing, when the overcurrent flowing to the switching element SW1 is detected by the overcurrent detector 203, and the voltage of the FC stack 100 detected by the voltage sensor 202 becomes a specified determination threshold or less.

Figure 2:
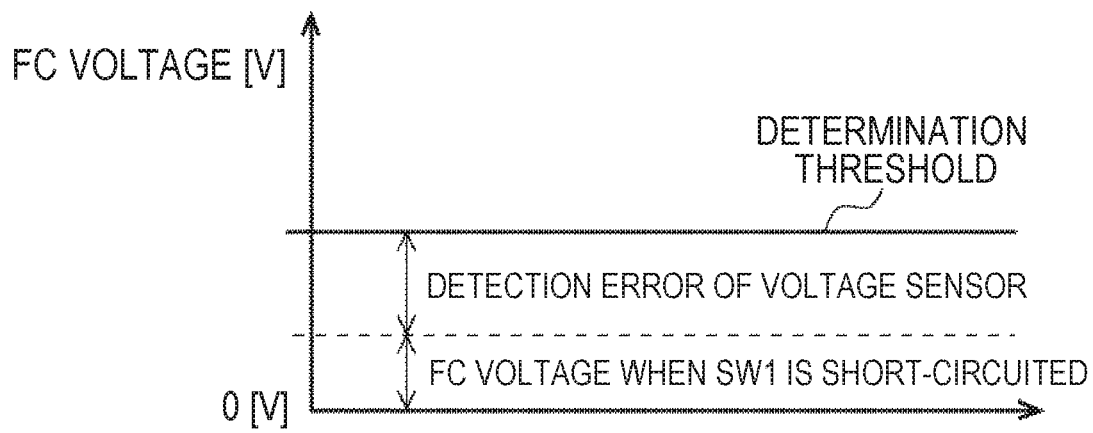
FIG. 2 illustrates an example of a method for setting a determination threshold.

FIG. 2 illustrates an example of a method for setting the determination threshold. A voltage value of the voltage detected by the voltage sensor 202 when the switching element SW1 is short-circuited is used as a true value, and a detection error of the voltage sensor 202 is added to the true value to obtain the determination threshold. Thus, the determination threshold is set in consideration of the detection error of the voltage sensor 202, which makes it possible to avoid erroneous determination of whether or not to execute the fail-safe processing.

The FDC-ECU 201 determines whether or not to execute the fail-safe processing based on the voltage detected by the voltage sensor 202 at the timing of F/S determination performed after the lapse of specified time from the timing when the overcurrent is detected by the overcurrent detector 203.

The determination needs to be executed after the voltage detected by the voltage sensor 202 reaches the level that can provide easily distinction between the voltage values when the switching element SW1 is short-circuited and the voltage values when the switching element SW1 is not short-circuited.

Therefore, the F/S determination timing needs to be set in consideration of at least a response delay of the voltage sensor 202. Accordingly, in the present embodiment, the F/S determination timing is set based on the response delay of the voltage sensor 202, a margin, and a system permissible waiting time.

Assume that the voltage detected by the voltage sensor 202 is 0 [V] when the switching element SW1 is short-circuited and the voltage is about 330 [V] when the switching element SW1 is not short-circuited. In this case, it can be considered that the F/S determination timing may be the timing 200 [ms] after the timing when the overcurrent detector 203 detects the overcurrent.

Figure 3:
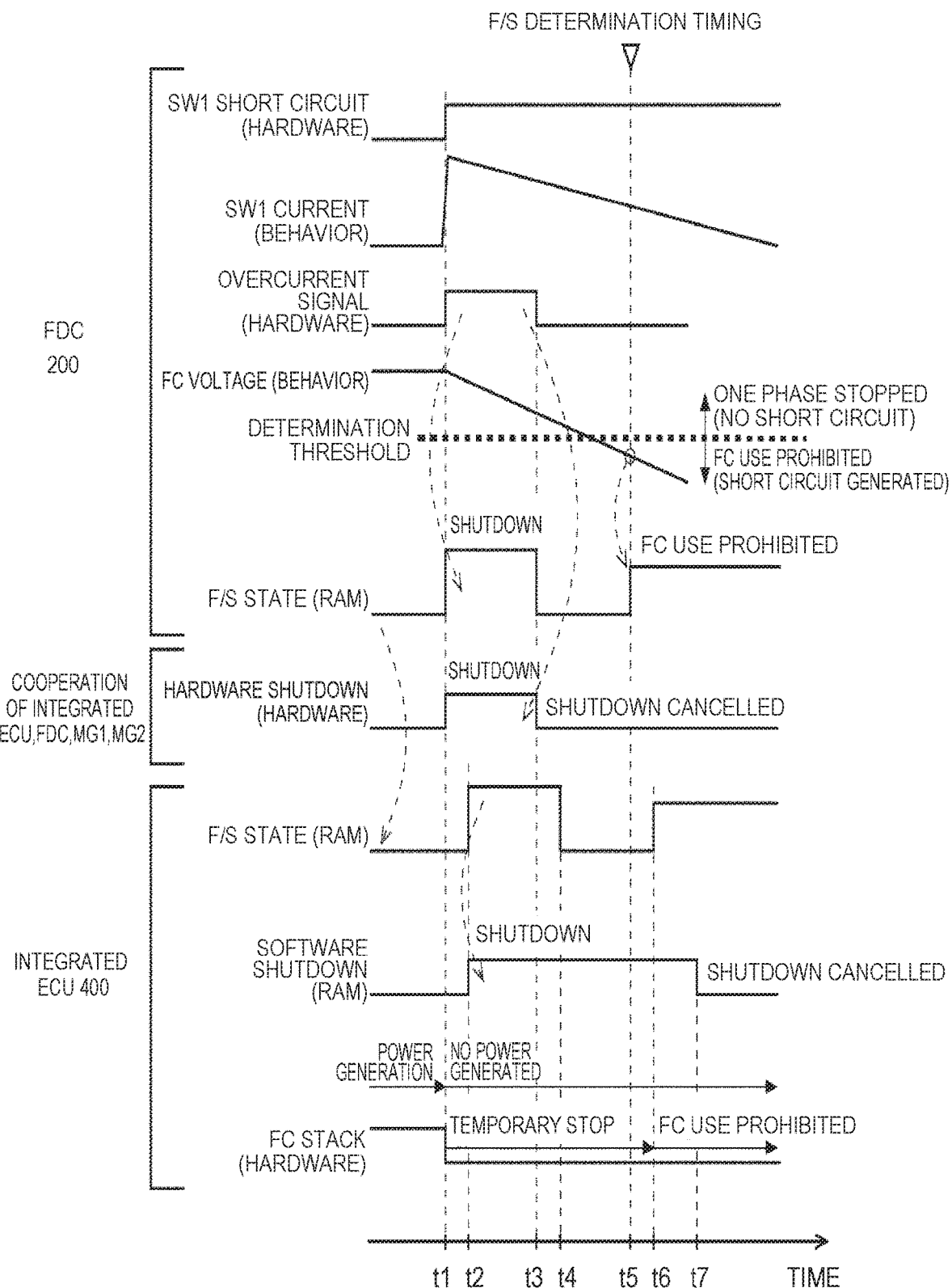
FIG. 3 is a timing chart illustrating an operation example when a switching element is short-circuited in the fuel cell system according to the present embodiment.

A description is now given of the operation of the present embodiment. FIG. 3 is a timing chart illustrating an operation example when the switching element SW1 is short-circuited in the fuel cell system 1 according to the present embodiment.

An upper portion of FIG. 3 illustrates the state of the FC boost converter 200. "SW1 short circuit" represents a short state of the switching element SW1. When the SW1 short circuit is set to ON, it means that the switching element SW1 is short-circuited. "SW1 current" represents the behavior of current flowing to the switching element SW1. "Overcurrent signal" represents an overcurrent signal output from the overcurrent detector 203. The signal is set to ON when an overcurrent flows to the switching element SW1. "FC voltage" represents the behavior of the voltage of the FC stack 100 detected by the voltage sensor 202. "F/S state" is the information indicating the state of the fail-safe processing. The information is stored in a random access memory (RAM) of the FDC-ECU 201, and is transferred to the integrated ECU 400 through the CAN. "F/S state" becomes zero in a normal state or during determination. When use of the FC stack 100 is prohibited, "F/S state" becomes 3, and when the fuel cell system 1 is shut down, "F/S state" becomes 4.

A central portion of FIG. 3 illustrates a cooperation state of the integrated ECU 400, the FC boost converter 200, and the motor generators MG1, MG2 through the hardware shutdown line. "Hardware shutdown" represents the state of the fuel cell system 1 shut down by hardware. When "hardware shutdown" is set to ON, it means that the fuel cell system 1 is shut down by hardware. In this specification, one example of hardware shutdown of the fuel cell system 1 is defined as stopping air and hydrogen supply to the FC stack 100 to shut down the fuel cell system 1.

A lower Portion of FIG. 3 illustrates the state of the integrated ECU 400. "F/S state" is information transferred from the FDC-ECU 201 and stored in the RAM of the integrated ECU 400. "Soft shutdown" is the information indicating the state of the fuel cell system 1 shut down by software. The information is stored in the RAM of the integrated ECU 400. "Soft shutdown" is set to ON when software shutdown of the fuel cell system 1 is performed. In this specification, software shutdown of the fuel cell system 1 is defined as shutting down the fuel cell system 1 by setting the information in the RAM, which is exchanged in the system, to a value indicating shutdown of the fuel cell system 1. "FC stack" represents the state of the FC stack 100. When "FC stack" is set to ON, it means that the FC stack 100 is generating electric power.

It is assumed that at time t1, the switching element SW1 is short-circuited as shown in "SW1 short circuit". Then, as shown in "SW1 current", an overcurrent flows to the switching element SW1. Accordingly, the overcurrent detector 203 detects the overcurrent, and an overcurrent signal is set to ON as shown in "overcurrent signal." From that time forth, the short-circuit current only in proportion to the fuel (hydrogen) remaining in the FC stack 100 flows to the switching element SW1. Since the switching element SW1 is short-circuited, the voltage of the FC stack 100 detected by the voltage sensor 202 gradually declines as shown in "FC voltage".

In response to the overcurrent signal being set to ON, the FDC-ECU 201 determines to execute the processing of shutting down the fuel cell system 1 as the fail-safe processing. The FDC-ECU 201 sets "F/S state" stored in the RAM of the FDC-ECU 201 to 4 that is a value indicating that the fuel cell system 1 is shut down.

In response to the overcurrent signal being set to ON, the integrated ECU 400, the FC boost converter 200, and the motor generator MG1, MG2 cooperate through the hardware shutdown line, and the integrated ECU 400 stops air and hydrogen supply to the FC stack 100. Accordingly, as shown in "hardware shutdown", hardware shutdown of the fuel cell system 1 is performed. As a consequence, as shown in "FC stack" of FIG. 3, power generation of the FC stack 100 stops.

"F/S state" of the FDC-ECU 201 is reflected upon "F/S state" stored in the RAM of the integrated ECU 400 with a delay of (t2−t1). At time t2, "F/S state" becomes 4 that is a value indicating that the fuel cell system 1 is shut down.

In response to the information of "F/S state" becoming 4, the integrated ECU 400 sets "soft shutdown" stored in the RAM of the integrated ECU 400 to ON indicating that the fuel cell system is shut down by software. Since "soft shutdown" information in the RAM is exchanged inside the system, the fuel cell system 1 is shut down also by software.

After that, it is assumed that at time t3, the overcurrent is no longer detected in the switching element SW1, and the overcurrent signal is set to OFF as shown in "overcurrent signal".

In response to the overcurrent signal being set to OFF, the FDC-ECU 201 sets "F/S state" stored in the RAM of the FDC-ECU 201 to zero that is a value indicating that the F/S state is in the normal state or during determination.

In response to the overcurrent signal being set to OFF, the cooperation among the integrated ECU 400, the FC boost converter 200, and the motor generators MG1, MG2 is cancelled. Accordingly, as shown in "hardware shutdown", hardware shutdown of the fuel cell system 1 is cancelled.

"F/S state" of the FDC-ECU 201 is reflected upon "F/S state" stored in the RAM of the integrated ECU 400 with a delay of (t4−t3). At time t4, "F/S state" becomes zero that is a value indicative of the normal state or during determination.

However, even when "F/S state" becomes zero, the integrated ECU 400 keeps "soft shutdown" stored in the RAM of the integrated ECU 400 to ON indicating that the fuel cell system 1 is shut down by software. Therefore, since the fuel cell system 1 is continuously shut down by software, power generation of the FC stack 100 remains stopping as shown in "FC stack."

When the F/S determination timing comes at time t5, the FDC-ECU 201 compares the voltage of the FC stack 100 with the determination threshold. Here, since the voltage of the FC stack 100 is equal to or less than the determination threshold, the FDC-ECU 201 determines that the switching element SW1 is short-circuited, and determines execution of the processing that prohibits use of the FC stack 100 as the fail-safe processing. Accordingly, the FDC-ECU 201 sets "F/S state" stored in the RAM of the FDC-ECU 201 to 3 that is a value indicating that the use of the FC stack 100 is prohibited.

"F/S state" of the FDC-ECU 201 is reflected upon "F/S state" stored in the RAM of the integrated ECU 400 with a delay of (t6–t5). At time t6, "F/S state" becomes 3 that is a value indicating that the use of the FC stack 100 is prohibited.

The integrated ECU 400 prohibits use of the FC stack 100, in response to "F/S state" becoming 3. Accordingly, as shown in "FC stack", power generation of the FC stack 100 remains stopping. Therefore, even when the switching element SW1 is short-circuited, and a short-circuit current flows from the FC stack 100, the duration of the short-circuit current is shortened. Accordingly, occurrence of a failure caused by overheating of the component parts (the FC stack 100, the coil L1, the switching element SW1, and a bus bar) locating on the route of the short-circuit current is suppressed.

For example, the integrated ECU 400 performs processing that stops air and hydrogen supply to the FC stack 100 as the processing of prohibiting use of the FC stack 100. Or the integrated ECU 400 performs processing that reduces contribution of air to the reaction by supplying hydrogen to the cathode side of the FC stack 100 to remove the air from a specified reaction point.

Or the integrated ECU 400 performs processing that swiftly consumes fuel (hydrogen) remaining in the FC stack 100 as the processing of prohibiting use of the FC stack 100. Specifically, the integrated ECU 400 raises the voltage boosted by the FC boost converter 200, or when single-phase driving is performed, the single-phase driving is changed to a plural-phase driving. When the plural-phase driving is performed, the short-circuit current can be sent to the phases other than the short phase, which prevents the short-circuit current from concentrating to the short phase. As a result, a possibility that the component parts are overheated can be reduced.

Since the integrated ECU 400 prohibits the use of the FC stack 100, it is not necessary to shut down the fuel cell system 1 by software. Accordingly, at any timing (timing of time t7 in FIG. 3) after "F/S state" becomes 3 at time t6, "soft shutdown" stored in the RAM of the integrated ECU 400 is set to OFF that is a value indicating that software shutdown of the fuel cell system 1 is canceled. That is the end of the operation.

After time t7, the software shutdown of the fuel cell system 1 is canceled, and the use of the FC stack 100 is prohibited. Accordingly, when the vehicle is traveling, and the vehicle includes an electric vehicle (EV) traveling function, the integrated ECU 400 may execute EV traveling.

Although not mentioned in the above description, there is a case where the voltage of the FC stack 100 exceeds the determination threshold at the F/S determination timing that is time t5 in FIG. 3. In this case, the overcurrent flows to the switching element SW1 but the switching element SW1 is not short-circuited. As described in the foregoing, the FDC-ECU 201 operates the switching element SW1, while checking whether or not the current detected by the current sensor disposed between the FC stack 100 and the coil L1 is a desired current value. When the current sensor fails and exhibits a negative value, the FDC-ECU 201 may excessively operate the switching element SW1 to achieve the desired current value. As a result, an overcurrent may be generated, and the switching element SW1 may perform self-protection from the overcurrent. In this case, since the switching element SW1 performs self-protection, it is possible to prevent the switching element SW1 from short-circuiting. This is the case where the overcurrent flows to the switching element SW1 but the switching element SW1 is not short-circuited. In such a case, it can be presumed that a certain failure, which causes an overcurrent, occurs in a determination phase. Accordingly, the integrated ECU 400 executes processing that stops the determination phase (stops one phase) as the fail-safe processing.

According to the embodiment as described in the foregoing, power generation of the FC stack 100 is stopped when the overcurrent flowing to the switching element SW1 is detected and the voltage value of the FC stack 100 detected by the voltage sensor 202 becomes a specified value or less.

Accordingly, when the overcurrent flowing to the switching element SW1 is detected, and the voltage value of the FC stack 100 becomes the specified value or less, it can be determined that the switching element SW1 is short-circuited, and the fail-safe processing can be executed based on the determination. Therefore, when the switching element SW1 is short-circuited, the fail-safe processing can be executed.

The present disclosure is not limited to the embodiment disclosed, and appropriate modifications are possible without departing from the scope of the present disclosure. For example, one ECU may execute both the function of FDC-ECU 201 and the function of the integrated ECU 400.

What is claimed is:

1. A fuel cell system, comprising:
a fuel cell stack;
a voltage sensor configured to detect voltage of the fuel cell stack;
a fuel cell relay connected to the fuel cell stack;
a switch connected between the fuel cell stack and the fuel cell relay, an overcurrent detector configured to detect an overcurrent flowing to the switch;
a FC boost converter, wherein the FC boost converter includes the voltage sensor and the switch; and
a power generation stop device including a processor configured to stop power generation of the fuel cell stack in response to the overcurrent detector detecting the overcurrent and the detected voltage becoming a specified value or less, wherein
the power generation stop device is configured to stop power generation of the fuel cell stack by raising a voltage boosted by the FC boost converter to consume fuel remaining in the fuel cell stack when the detected voltage becomes the specified value or less after lapse of specified time from detection of the overcurrent by the overcurrent detector.

2. A fuel cell system, comprising:
a fuel cell stack;
a voltage sensor configured to detect voltage of the fuel cell stack;
a fuel cell relay connected to the fuel cell stack;

a switch connected between the fuel cell stack and the fuel cell relay;
an overcurrent detector configured to detect an overcurrent flowing to the switch;
a FC boost converter, wherein the FC boost converter includes the voltage sensor and the switch; and
an electronic control unit programmed to stop power generation of the fuel cell stack in response to the overcurrent detector detecting the overcurrent and the detected voltage becoming a specified value or less, wherein
the electronic control unit is programmed to stop power generation of the fuel cell stack by raising a voltage boosted by the FC boost converter to consume fuel remaining in the fuel cell stack when the detected voltage becomes the specified value or less after lapse of specified time from detection of the overcurrent by the overcurrent detector.

3. The fuel cell system according to claim 1, wherein the power generation stop device is configured to stop power generation of the fuel cell stack by stopping air and hydrogen supply to the fuel cell stack.

4. The fuel cell system according to claim 2, wherein the electronic control unit is programmed to stop power generation of the fuel cell stack by stopping air and hydrogen supply to the fuel cell stack.

* * * * *